(12) United States Patent
Gerstler et al.

(10) Patent No.: US 7,994,668 B2
(45) Date of Patent: Aug. 9, 2011

(54) COOLING SYSTEM FOR ROTATING MACHINE

(75) Inventors: William Dwight Gerstler, Niskayuna, NY (US); Ayman Mohamed Fawzi El-Refaie, Niskayuna, NY (US); Murtuza Lokhandwalla, Clifton Park, NY (US); James Pellegrino Alexander, Ballston Lake, NY (US); Owen Scott Quirion, Clifton Park, NY (US); Pepe Palafox, Schenectady, NY (US); Xiaochun Shen, Schenectady, NY (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 219 days.

(21) Appl. No.: 12/467,382

(22) Filed: May 18, 2009

(65) Prior Publication Data

US 2010/0289386 A1    Nov. 18, 2010

(51) Int. Cl.
*H02K 9/19* (2006.01)
*H02K 1/28* (2006.01)

(52) U.S. Cl. .................. 310/61; 310/60 A; 310/156.48; 310/216.057; 310/216.074

(58) Field of Classification Search ............... 310/52, 310/58–59, 60 R, 61–63, 60 A, 64, 156.48–156.59, 310/216.007, 216.053, 216.057–216.058, 310/216.074, 216.079, 261.1
See application file for complete search history.

(56) References Cited

U.S. PATENT DOCUMENTS

| | | | |
|---|---|---|---|
| 3,681,628 A | 8/1972 | Krastchew | |
| 3,800,174 A * | 3/1974 | Butterfield et al. | 310/61 |
| 3,979,821 A * | 9/1976 | Noodleman | 29/598 |
| 4,241,269 A | 12/1980 | Antonov et al. | |
| 4,358,937 A | 11/1982 | Okamoto et al. | |
| 4,445,062 A * | 4/1984 | Glaser | 310/156.59 |
| 5,347,188 A | 9/1994 | Iseman et al. | |
| 6,175,177 B1 * | 1/2001 | Sabinski et al. | 310/156.55 |
| 6,191,511 B1 * | 2/2001 | Zysset | 310/60 A |
| 6,750,572 B2 | 6/2004 | Tornquist et al. | |
| 7,160,086 B2 | 1/2007 | Maceyka et al. | |
| 7,205,695 B2 * | 4/2007 | Smith | 310/216.004 |
| 7,489,057 B2 * | 2/2009 | Zhou et al. | 310/61 |
| 2010/0277017 A1 * | 11/2010 | Alexander et al. | 310/61 |
| 2010/0277028 A1 * | 11/2010 | Alexander et al. | 310/156.51 |

OTHER PUBLICATIONS

Ray M. Calfo, Matt B. Smith, John E. Tessaro; High-Speed Generators for Power-Dense, Medium-Power, Gas Turbine Generator Sets; Naval Engineers Journal; 2007; pp. 63-81.

* cited by examiner

*Primary Examiner* — Tran N Nguyen
(74) *Attorney, Agent, or Firm* — Eileen W. Gallagher

(57) ABSTRACT

An electrical machine comprising a rotor is presented. The electrical machine includes the rotor disposed on a rotatable shaft and defining a plurality of radial protrusions extending from the shaft up to a periphery of the rotor. The radial protrusions having cavities define a fluid path. A stationary shaft is disposed concentrically within the rotatable shaft wherein an annular space is formed between the stationary and rotatable shaft. A plurality of magnetic segments is disposed on the radial protrusions and the fluid path from within the stationary shaft into the annular space and extending through the cavities within the radial protrusions.

19 Claims, 8 Drawing Sheets

COOLING SYSTEM FOR ROTATING MACHINE

STATEMENT REGARDING FEDERALLY SPONSORED RESEARCH & DEVELOPMENT

This invention was made with Government support under contract number DE-FC26-07NT43122 awarded by the Department of Energy. The Government has certain rights in the invention.

BACKGROUND

The subject matter disclosed herein relates generally to cooling of rotating machines, and more particularly, to rotor cooling.

Electric motors can generate considerable heat, making motor cooling difficult, especially in high power output motors with size and weight constraints. Additionally, in order to avoid excessive wear due to differential thermal expansion, it is important to cool the inner motor components (e.g., rotor) as well as the outer motor components (e.g., casing, stator). Motor cooling can be a challenge for motors that are subjected to a wide range of ambient temperatures, humidity levels, and dust/dirt levels.

A number of different approaches have been implemented to cool electric motors. In one example, the size of the rotor and stator are selected so that heat transfer may occur through use of a gas in the air-gap between the rotor and stator. However, a common disadvantage in this example is increased mass and volume of the machine.

Another method of cooling is to flood the rotor cavity with a dielectric fluid such as oil. As the rotor speed increases, the oil is flung around the machine, resulting in a high heat transfer coefficient along the surfaces of the rotor in contact with the oil. Heat is thus transferred from the rotor to the oil, and then removed from the oil via natural convection, forced convection, or liquid cooling. However, as speed increases, churning losses in the fluid become high and limit the usefulness of this technique.

There is a need to provide an improved rotor assembly cooling system.

BRIEF DESCRIPTION

Briefly, in one embodiment, an electrical machine comprises a rotor disposed on a rotatable shaft and defining a plurality of radial protrusions extending from the shaft up to a periphery of the rotor. The radial protrusions have cavities. A stationary shaft is disposed concentrically within the rotatable shaft wherein an annular space is formed between the stationary and rotatable shaft. Magnetic segments are disposed on the radial protrusions, and a fluid path extends from within the stationary shaft into the annular space and through the cavities within the radial protrusions.

In another embodiment, an electrical machine comprises a stator having stator coils interposed between stator laminations. A rotor is disposed on a rotatable shaft that defines a plurality of radial protrusions extending from the shaft towards a periphery of the rotor. Each of the protrusions has at least one cavity extending therethrough. A stationary shaft having a hollow region is disposed concentrically within the rotatable shaft, wherein an annular space is formed between the stationary and rotatable shafts. A fluid path extends from the hollow region, into the annular space, and through the cavities of the radial protrusions. Magnetic segments are disposed on the radial protrusions, and a seal is disposed between the stationary shaft and the rotatable shaft enclosing the annular space and provides a pathway to an exit.

In another embodiment, a rotor cooling system is provided. The rotor cooling system includes an annular space defined between a rotatable shaft and a hollow stationary shaft. A fluid path is defined from within the hollow stationary shaft and into the annular space. The cooling system includes plurality of radial cavities extending from the annular space towards a periphery of radial protrusions and plurality of axial holes on the radial protrusions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Power output of rotating electrical machines such as motors and generators may be increased by increasing the machine diameter and/or length. However, when increasing the machine size, the machine mass increases proportionately with no significant change in power density. For a given rotating machine mass, power and power density increase as the rotating speed increases. Further, the amount of increase in mass is limited by the maximum speed limit of the machine. Another technique to increase power density of rotating machines is to increase the stator current loading and thus the air gap magnetic flux density. However, this technique requires additional cooling elements that result in added machine mass. Embodiments disclosed herein provide enhanced cooling of rotating machines without requiring such additional mass.

Figure 1:
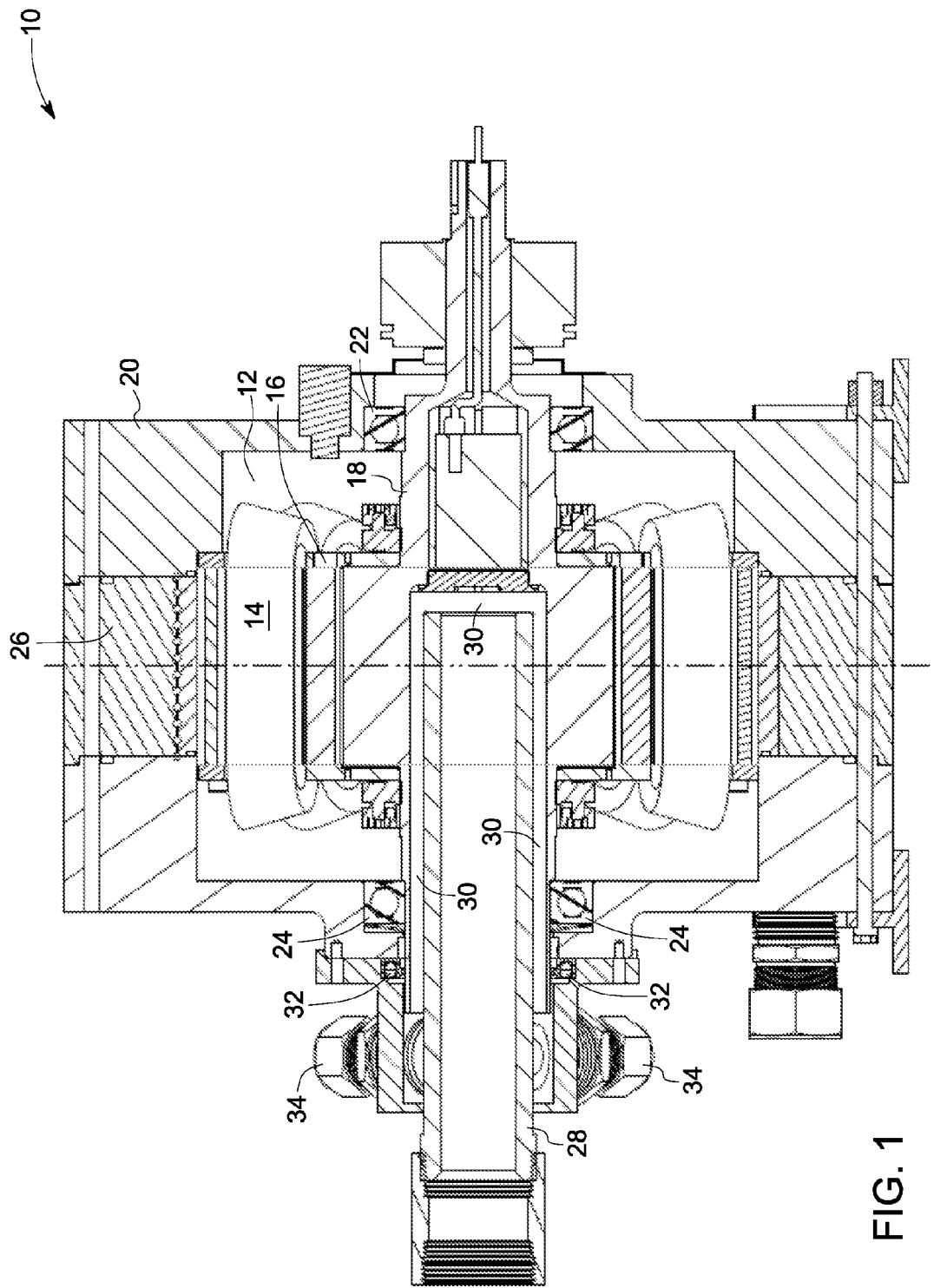
FIG. 1 illustrates cross-sectional view of an electrical machine implementing a rotor cooling system according to an aspect of the invention.

FIG. 1 is a cross-sectional view of an electrical machine implementing a rotor cooling system according to an aspect of the invention. The electrical machine 10 includes a stator 12 having stator windings 14 disposed adjacent to a rotor core 16 fixed on a rotatable shaft 18. The rotatable shaft 18 is rotatably coupled to a stator frame 20 via bearings 22, 24. Stator 12 having stator windings 14 and a stator core is disposed within the stator frame 20, and an air gap (not shown)

is formed between the rotor 16 and the stator 12) A stationary shaft 28 is disposed concentrically within the rotatable shaft 18 to form an annular space 30 between stationary shaft 28 and rotatable shaft 18. A seal 32 is disposed between the rotatable shaft 18 and the stationary shaft 28 enclosing the annular space 30 and further coupled to an exit 34. Working of sub assemblies of the electrical machine 10 are discussed in detail below.

Figure 2:
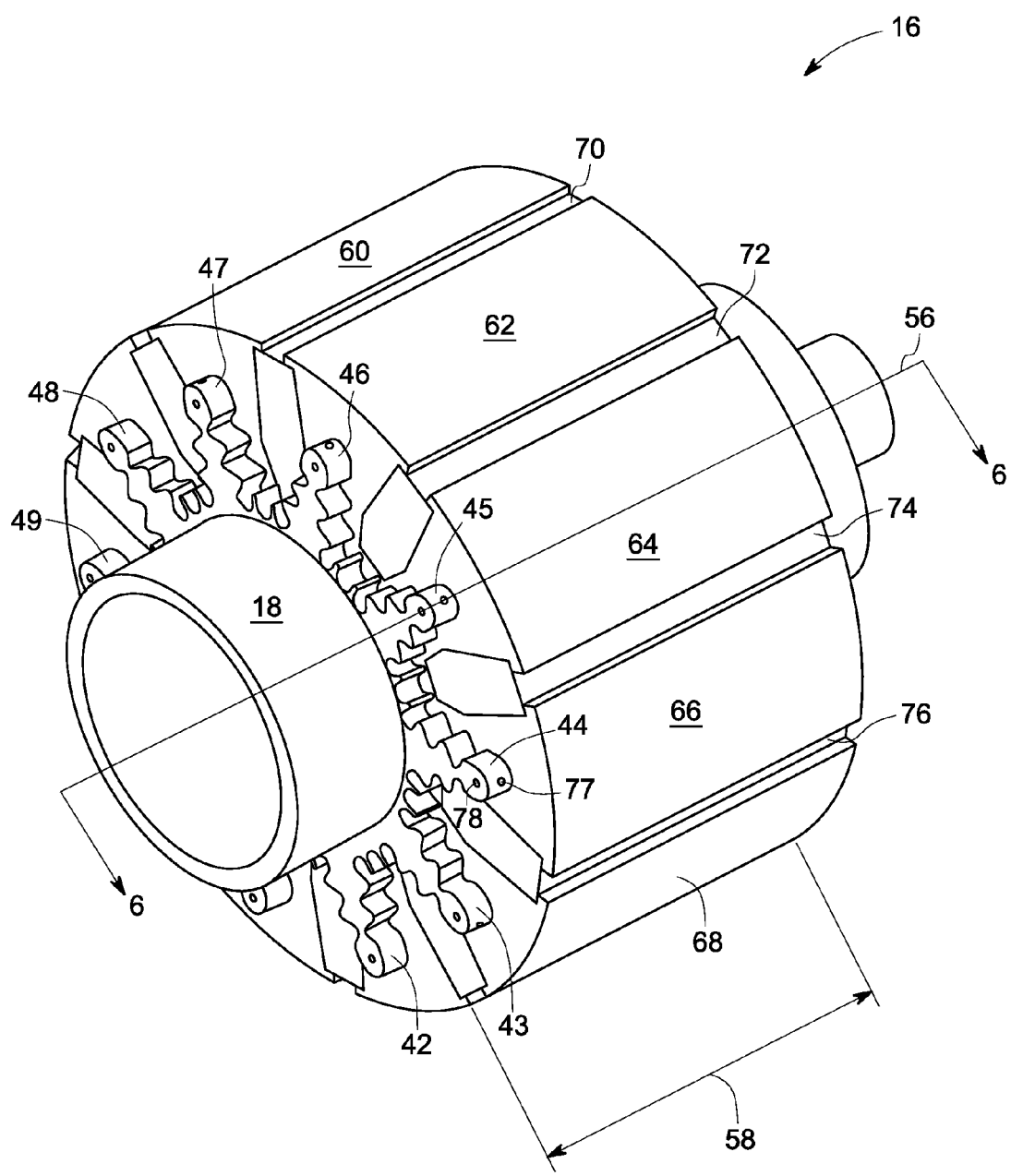
FIG. 2 illustrates a perspective view of a rotor implemented in the electrical machine of FIG. 1.

FIG. 2 illustrates a perspective view of a rotor implemented in the electrical machine of FIG. 1. The rotor 16 includes multiple radial protrusions illustrated by numerals 42-49 extending from the rotatable shaft 18 up to a periphery 56 of the rotor 16. Radial protrusions extend along the axial length 58 of the rotor. A plurality of magnetic segments, 60, 62, 64, 66, 68 are provided with each being disposed on a respective one of the protrusions. In one example, the magnetic segments comprise steel laminations. Multiple permanent magnets, for example 70, 72, 74, 76 are provided with each being interposed between a respective pair of the magnetic segments. Each radial protrusion includes multiple cavities having axial and radial holes such as shown by elements 77 and 78 to provide a fluid path.

Figure 3:
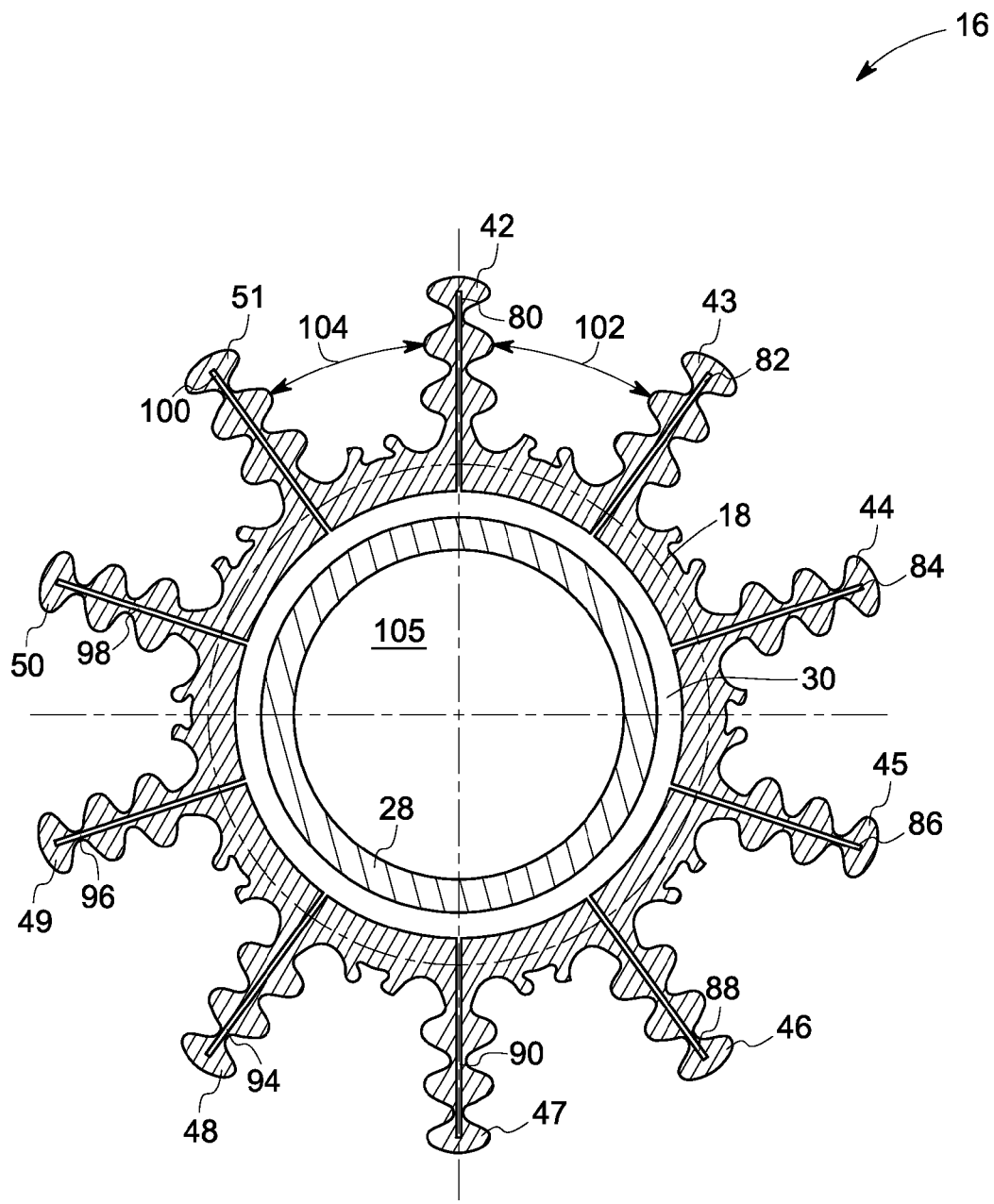
FIG. 3 is a cross-sectional axial view of the rotor implemented according to an aspect of the invention.

FIG. 3 is a cross-sectional axial view of an embodiment of the rotor wherein the magnetic segments are not shown for convenience of illustrating the structure of radial protrusions. The stationary shaft 28 is disposed concentrically within the rotatable shaft 18 forming the annular space 30, and, in the embodiment of FIG. 3, each protrusion 42-51 respectively has cavities 80-100 extending from the annular space 30 toward the periphery of the protrusions. The magnetic segments are disposed on the protrusions, for example on 42 that occupies at least partially the space 102, 104 available between two protrusions. Furthermore, the space 102, 104 accommodates permanent magnets between the magnetic segments as illustrated in FIG. 2. A cooling liquid or a coolant may be circulated from within the hollow stationary shaft 105 and into the annular space 30. In one example, the coolant comprises water. Other non-limiting coolant examples include water-propylene glycol, water-ethylene glycol, oil, and Fluorinerts.

Figure 4:
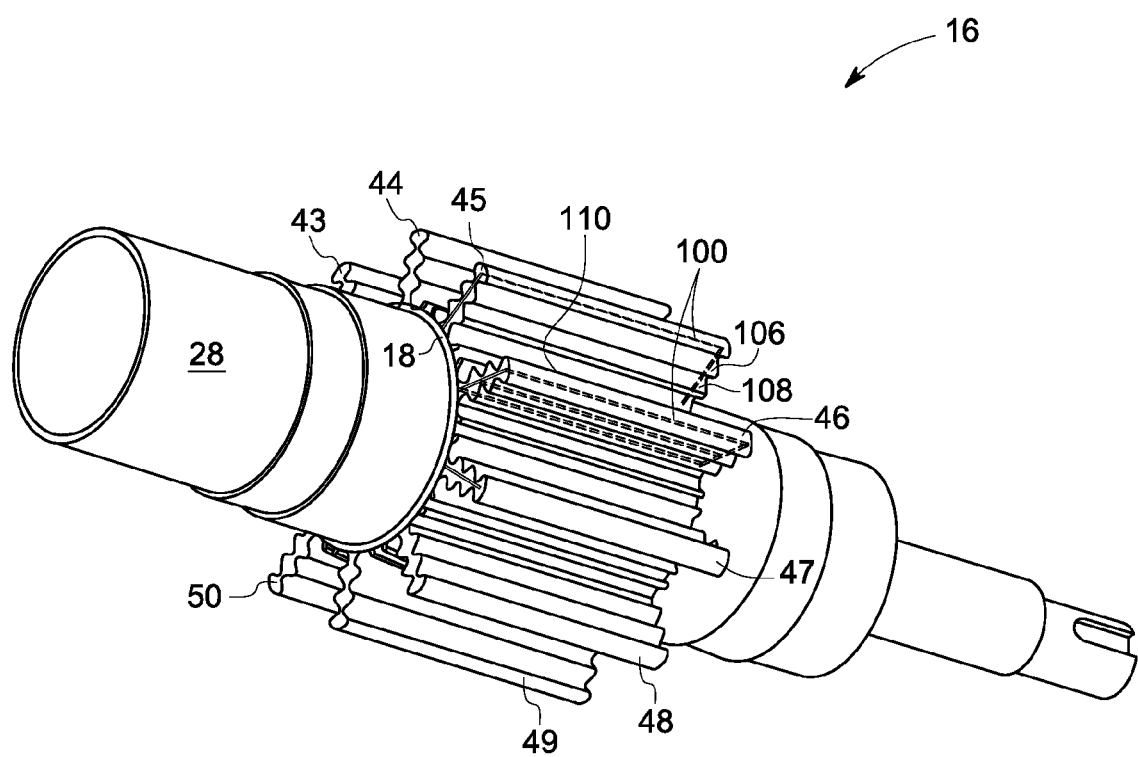
FIG. 4 is a perspective view of the rotor according to an embodiment of the invention.

FIG. 4 is a perspective view of the rotor according to an embodiment of the invention. Each protrusion may optionally include multiple fins. In the illustrated embodiment, for example protrusion 45 includes fins 106, 108. The cavity 100 extends from the rotatable shaft 18 radially up towards the periphery 110 and further axially along length of the rotor. The fins 106 and 108 may include similar such cavities extending axially to facilitate flow of coolant. Coolant that flows within the cavities help removes heat from the magnetic segments (FIG. 2) that are positioned on the protrusions.

Figure 5:
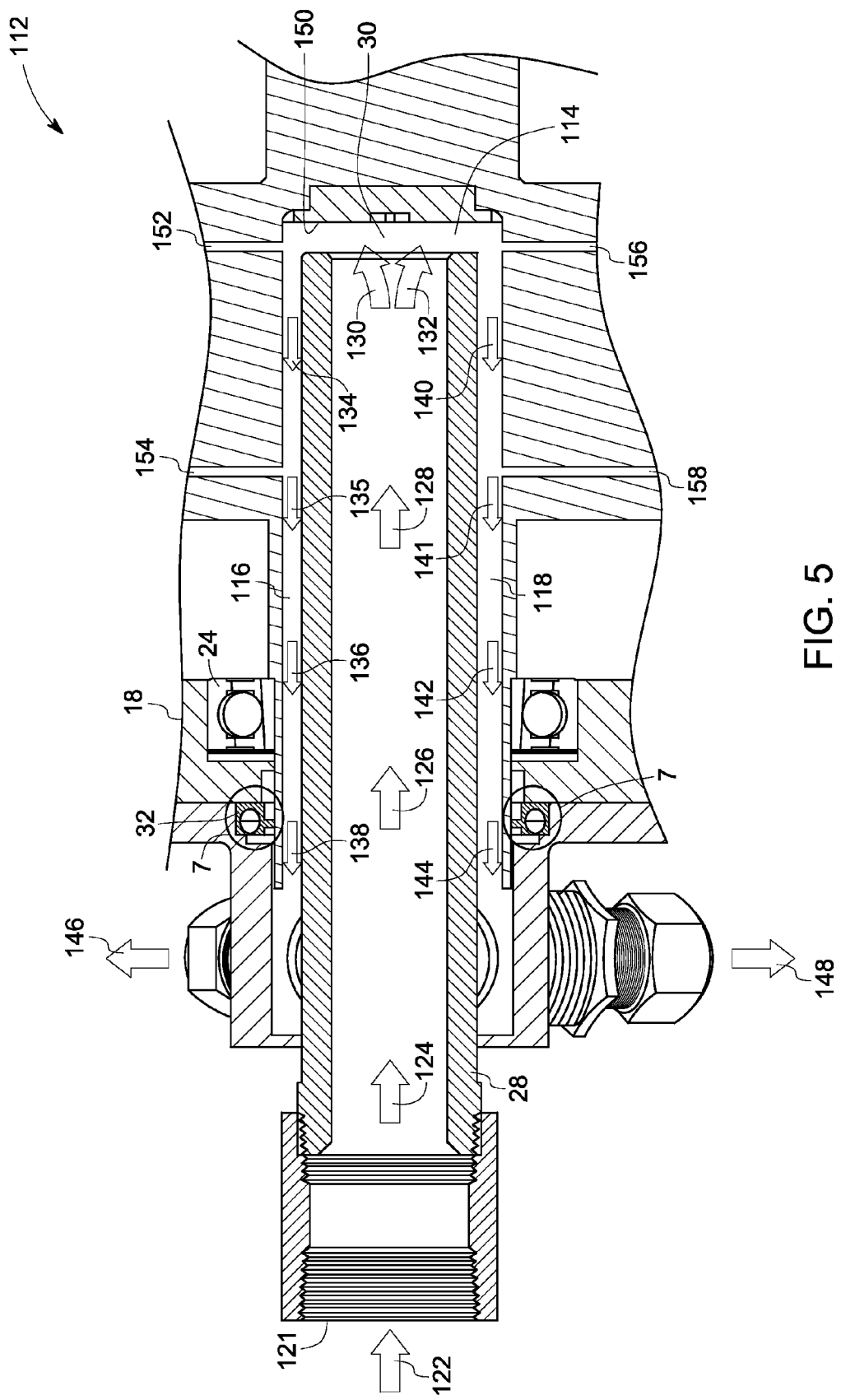
FIG. 5 illustrates a detailed view of cooling liquid path through the annular space and the cavities during an operation of the electrical machine.

FIG. 5 illustrates a detailed view of an exemplary cooling liquid path through the annular space and the cavities during an operation of the electrical machine. Further, FIG. 5 is a zoomed in view of a portion of the electrical machine of FIG. 1. In an exemplary embodiment, the zoomed in view 112 depicts rotatable shaft 18 rests on bearing 24. Stationary shaft 28 is disposed concentrically within the rotatable shaft 18 defining the annular space 30. The stationary shaft 28 is disposed towards a far end 150 of the rotatable shaft such that the annular space 30 is defined in the end region (114) as well as the side regions (116, 118). Coolant may be fed through a pump (not shown) radially inward (122) into the hollow stationary shaft 28 at an opening 121 of the stationary shaft. The coolant flows within the hollow stationary shaft through a pathway represented by arrows 124, 126, and 128. At the far end 150, the coolant branches radially outward into paths 130 and 132. Coolant flows towards the exit via path 134-138 (and 140-144) and exits the rotating frame via the exit respectively through paths 146 and 148. Furthermore, the cooling liquid also flows through the cavities in the protrusions 152, 154, 156, and 158 to remove heat from core of the magnetic segments as discussed with respect to FIG. 4.

Figure 6:
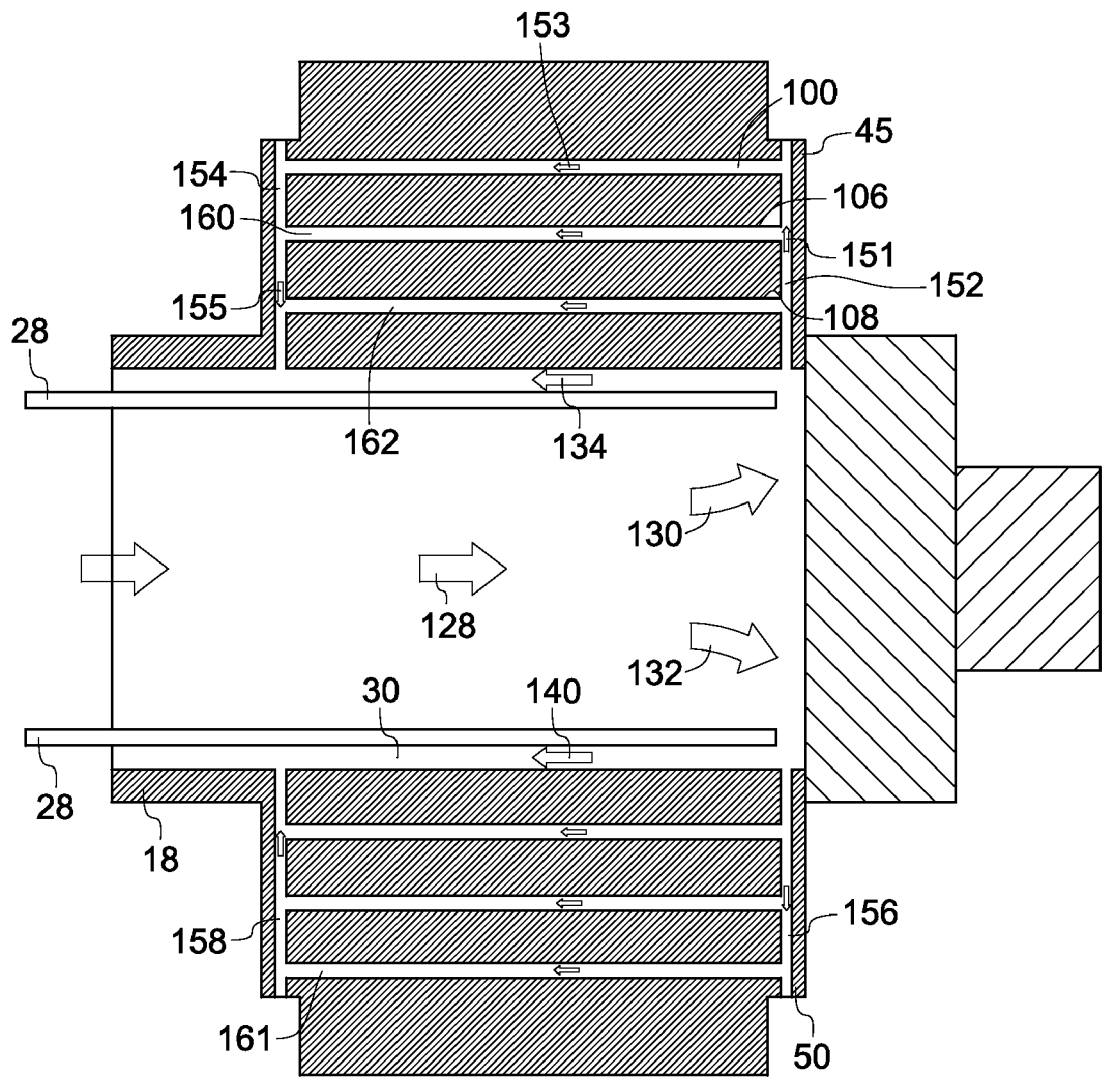
FIG. 6 illustrates flow of cooling liquid through the cavities and the annular space according to an embodiment of the invention.

FIG. 6 further illustrates an example of flow of coolant through the cavities and the annular space. In the illustrated embodiment, a portion of the branched coolant flow 130 passes through the cavity 152 (referenced by numeral 151) that extends up towards the periphery, then passes through cavity 100 which runs axially (referenced by numeral 153), and then flows back to the annular space via cavity 154 (referenced by numeral 155). Similarly, fins 106, 108 may include respective cavities 160, 162 having coolant flowing through and reaching the annular space via 154. As described herein, the cavity and flow arrangement for one protrusion 45 is discussed. However, similar arrangements may exist on some or each of the other protrusion 42-51. For example, protrusion 50 is shown as including cavities 156, 161, 158 coupled to the annular space 30.

The coolant removes some of the heat generated in the rotor due to electrical losses. The annular space 30 establishes balance between flow resistance and the liquid flow rate and thus enhances the heat transfer capability at the rotating surface. In an exemplary embodiment, the annular space is in the range of about 0.1 to 0.3 inches and is designed for electrical machine rating of about 30 kW to about 50 kW. For example, an input temperature of the cooling liquid of about 105° C. is designed to absorb heat from the rotor in the annular space 30 and the cavities that extend into core of the rotor. The output temperature of the cooling liquid at the exit may be about 115° C. which indicates a fluid temperature rise of about 10° C. The heated liquid may be pumped to heat exchangers if desired, and, once cooled, may be pumped back into the machine.

Figure 7:
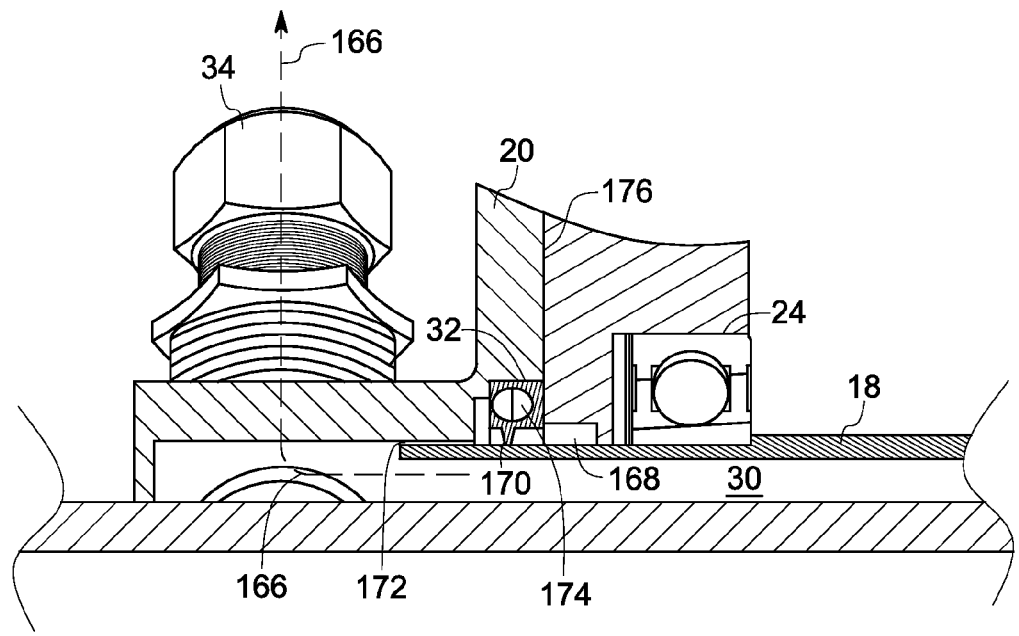
FIG. 7 illustrates a detailed view of the seal implemented in the electrical machine of FIG. 5.

FIG. 7 illustrates a detailed view of an exemplary seal to be used in the electrical machine of FIG. 1. The seal facilitates the coolant to traverse between rotating (shaft 18) and stationary frames as the coolant exits through exit 34. In one embodiment, the fluid exits the annular space 30 and enters the exit 34 as illustrated by the flow path 166. The exit plenum (not shown) is attached to exit 34 and coupled to external components such as pump and heat exchanger (not shown.) Most of the coolant exits through the outlet (146, 148 as referenced in FIG. 5.) A small gap 172 is provided between rotatable shaft 18 and the stator frame 20 such that the coolant may flow into this gap. At the end of the gap is a larger opening formed between a seal ring 174 and the rotatable shaft 18. The rubbing seal 170 is located in this opening area that seals the coolant between the rotatable shaft 18 and the seal ring 174. The seal ring may be bolted to a stator end plate 176. The rubbing seal 170 operates by forming a physical barrier between the rotating (shaft 18) and stationary surfaces (stator frame 20). Such rubbing seals are designed to withstand the friction that occurs with the rotatable shaft 18. A drainage groove 168 between the seal ring 174 and the bearing 24 may be provided, and an axial flow passage (not shown) may be used to link the drainage groove 168 to a collection for drained coolant outside the machine.

Figure 8:
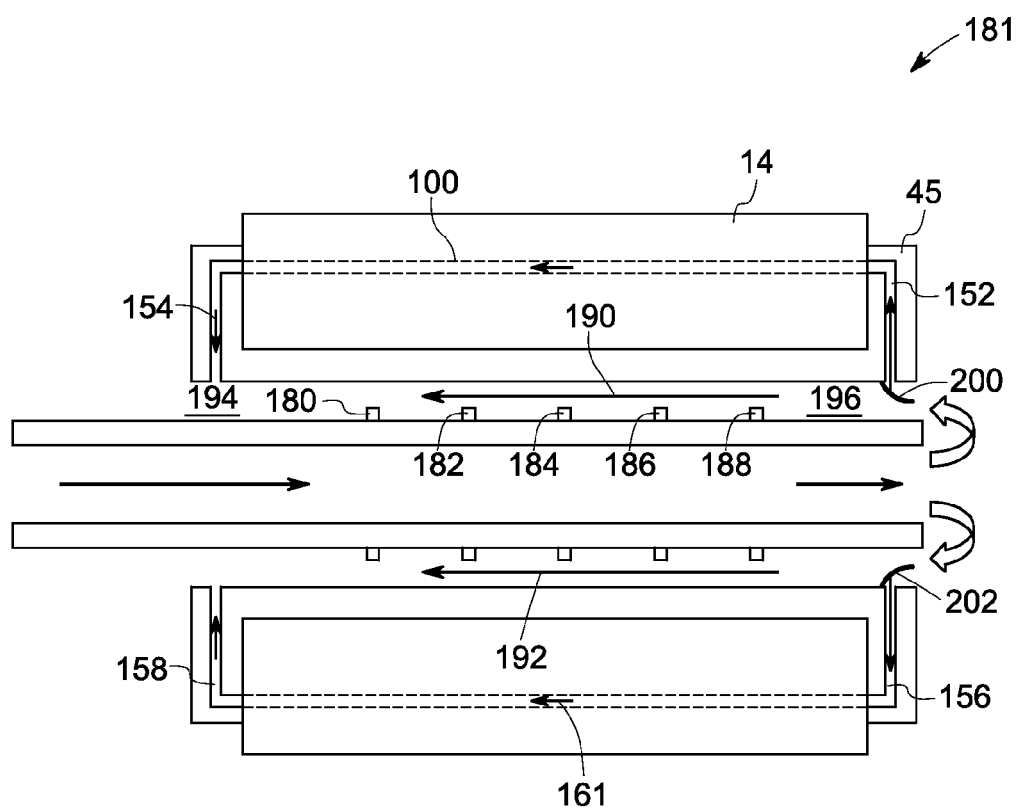
FIG. 8 illustrates a cross-sectional view of the rotor liquid cooling system implementing baffles in the annular space according to an embodiment of the invention.

FIG. 8 illustrates a cross-sectional view of the rotor liquid cooling system implementing baffles in the annular space according to an embodiment of the invention. At least one or more baffles 180-188 are disposed around the stationary shaft 28. Such baffle rings help in controlling a flow resistance in the two parallel paths 190, 192. The flow to each path 190, 192 may be adjusted by changing the dimensions of baffles. Accordingly, the design requirement of flow resistance determines the number of baffles.

In an exemplary operation, the location of the baffle ring affects the heat transfer in the rotor cooling system 181. Accordingly, baffle ring may be placed in an appropriate location in the annular space 30 for effective heat transfer. For example, for more flow through path 200, a baffle ring may be placed near 196, thus causing more flow resistance for path 190. The baffle ring 188 will cause more fluid to go through path 200. Additional baffles, such as 186, 184, 182, and 180 can be added for additional flow resistance. In addition to flow resistance, the baffles may be used to increase the flow disturbance and in turn increase heat transfer on surfaces adjacent and downstream of the baffles. By this way, coolant can be directed into the most heated positions using the baffles to execute an efficient heat transfer.

Figure 9:
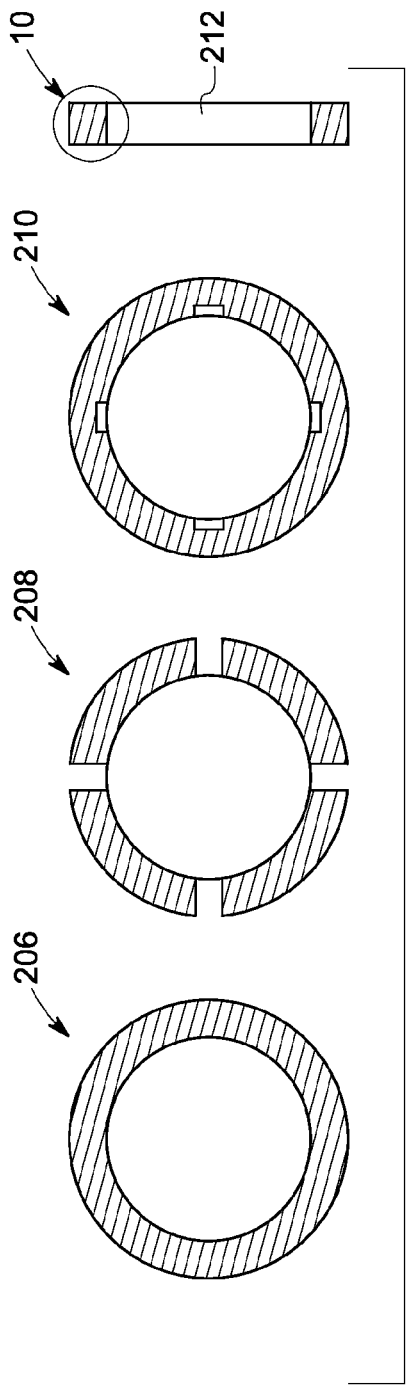
FIGS. 9 and 10 illustrates exemplary embodiments of the baffle ring structure implemented in the annular space of rotor of FIG. 8.
Figure 10:
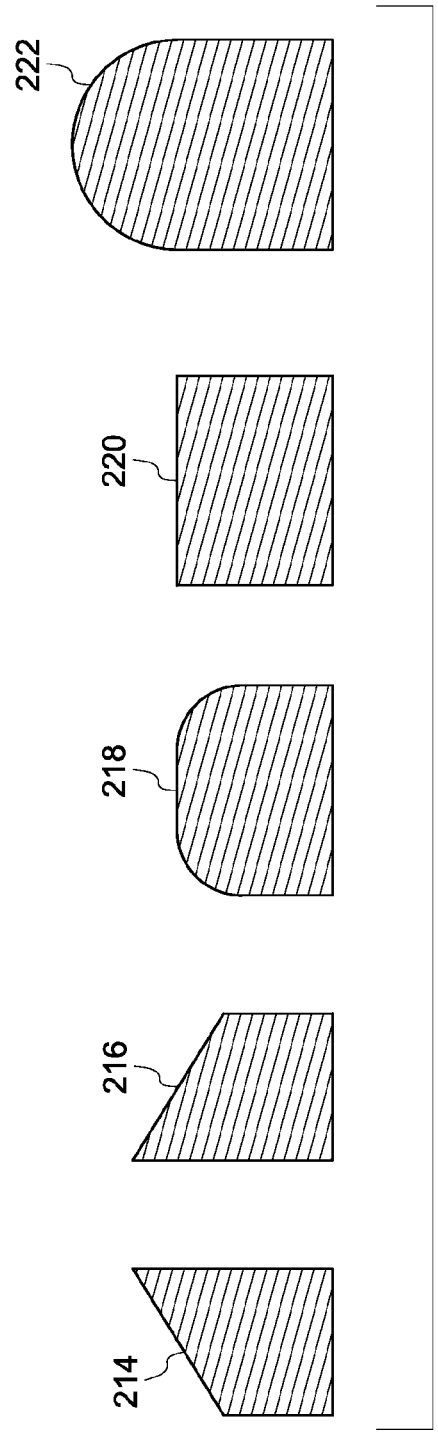

FIGS. 9 and 10 illustrate exemplary embodiments of various baffle ring structures for use in the annular space of rotor of FIG. 8. The baffle ring may include an even surface as illustrated in 206. In one embodiment, the baffle ring may include scallops at the inside diameter (210), or series of arcs (208), or may have a combination of arcs and scallops (not shown). As illustrated herein, four arcs/scallops are used. However, the number of arcs or scallops may vary based on the desired flow resistance. The diameter of the baffle and the depth of the scallops may also be varied accordingly. A side profile view of the baffle ring is illustrated by the reference numeral 212.

FIG. 10 illustrates various embodiments of the edges used in baffle ring of FIG. 9. Different embodiments 214-222 are possible choice of edges that may be implemented on the baffle ring of FIG. 9. The shape may affect the flow separation downstream of the baffles. For example, when place near 194 (referenced in FIG. 8), and desired not to affect the flow near 194, shape of the edges may be hydrodynamically designed to reduce flow separation. In another example, for greater flow separation a reverse ramp design (216) may be designed.

Advantageously, such rotor cooling design enables designing high power density rotating electric machines that generate losses within their rotor structure. By effective heat removal, internal temperature is maintained within electrical insulation material limits and other material thermal limits within the rotor. Presently contemplated embodiments of the invention remove losses via heat transfer, allowing the rotor to remain below rated temperatures. The effectiveness of the heat removal directly impacts the machine power density. Thus a more effective cooling scheme will allow the machine to be smaller, and enabling high power density machine design.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine comprising:
    a rotor having a rotatable shaft with an outer surface and a plurality of radial protrusions extending radially from the outer surface of the shaft, each of the protrusions having at least one cavity extending therethrough;
    a stationary shaft disposed concentrically within the rotatable shaft and including an interior hollow region, wherein an annular space is formed between the stationary and rotatable shafts; and
    a plurality of magnetic segments disposed on the radial protrusions,
    wherein a fluid path extends from the hollow region, into the annular space, and through the cavities of the radial protrusions.

2. The electrical machine of claim 1, wherein the radial protrusions extend along an axial portion of the rotating shaft.

3. The electrical machine of claim 1, wherein each magnetic segment comprises a plurality of laminated magnetic sheets.

4. The electrical machine of claim 3, further comprising permanent magnets interposed between respective pairs of adjacent magnetic segments.

5. The electrical machine of claim 1, wherein each of the protrusions comprises a hole in fluid connection with a respective one of the cavities.

6. The electrical machine of claim 1, wherein the annular space comprises baffles.

7. The electrical machine of claim 1, further comprising a coolant within the fluid path.

8. The electrical machine of claim 7, further comprising a seal between the rotating shaft and the stationary shaft.

9. The electrical machine of claim 8, wherein the seal facilitates a change in reference frame of the coolant from rotating frame to stator frame.

10. An electrical machine comprising:
    a stator comprising stator coils interposed between stator laminations;
    a rotor having a rotatable shaft with an outer surface and a plurality of radial protrusions extending radially from the outer surface of the shaft, each of the protrusions having at least one cavity extending therethrough;
    a stationary shaft having a hollow region and disposed concentrically within the rotatable shaft, wherein an annular space is formed between the stationary and rotatable shafts, wherein a fluid path extends from the hollow region, into the annular space, and through the cavities of the radial protrusions;
    a plurality of magnetic segments disposed on the radial protrusions; and
    a seal disposed between the stationary shaft and the rotatable shaft enclosing the annular space and comprising a pathway to an exit.

11. The electrical machine of claim 10, further comprising at least one baffle disposed in the fluid path.

12. The electrical machine of claim 11, further comprising at least one baffle disposed within the annular space.

13. The electrical machine of claim 10, wherein the radial protrusions comprise axial fins.

14. The electrical machine of claim 13, wherein the axial fins comprise axial holes coupled to the fluid path.

15. A rotor cooling system comprising:
    an annular space defined between a rotatable shaft and a hollow stationary shaft, the rotatable shaft having an outer surface and a plurality of radial protrusions extending radially outward from the outer surface;
    a fluid path from within the hollow stationary shaft and into the annular space;
    a plurality of cavities, each extending radially from the annular space towards a periphery of a respective one of the radial protrusions; and
    holes in the radial protrusions, each being in fluid connection with a respective one of the plurality of cavities.

16. The rotor cooling system of claim 15, wherein the annular space, the radial cavities, and the axial holes are coupled to form the fluid path.

17. The rotor cooling system of claim 16, further comprising a coolant circulating within the fluid path.

18. The rotor cooling system of claim 17, wherein the coolant traverses between rotating and stationary frames.

19. The rotor cooling system of claim 18, wherein a seal facilitates traversal of the coolant between rotating and stationary frames.

* * * * *